Aug. 13, 1957    J. R. OISHEI ET AL    2,802,232
WINDSHIELD CLEANING SYSTEM
Filed Oct. 14, 1954    4 Sheets-Sheet 1
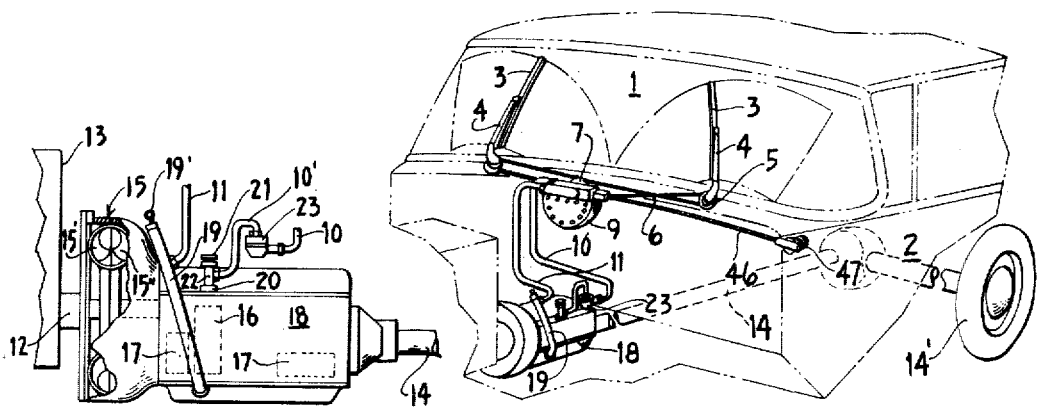
Fig. 1
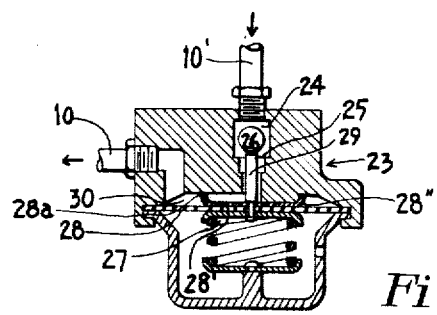
Fig. 2
Fig. 3
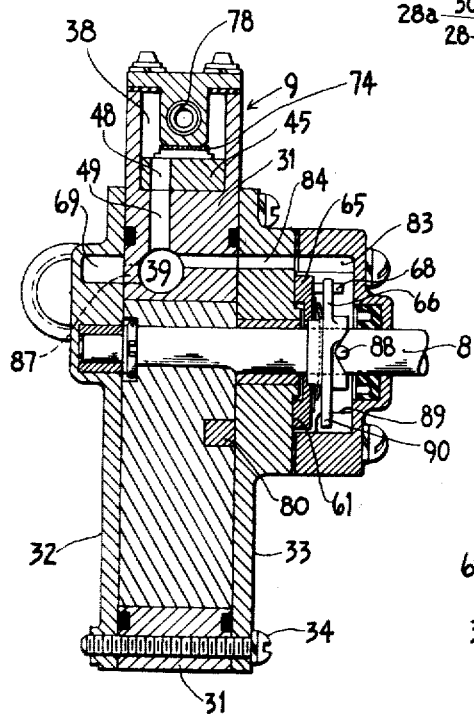
Fig. 8
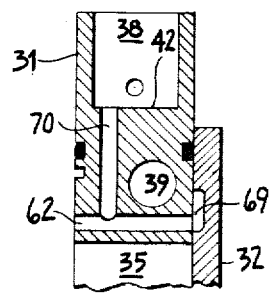
Fig. 9
Fig. 10
INVENTORS
John R. Oishei,
Martin Bitzer and
BY Anthony C. Scinta
Bean, Brooks, Buckley & Bean
ATTORNEYS

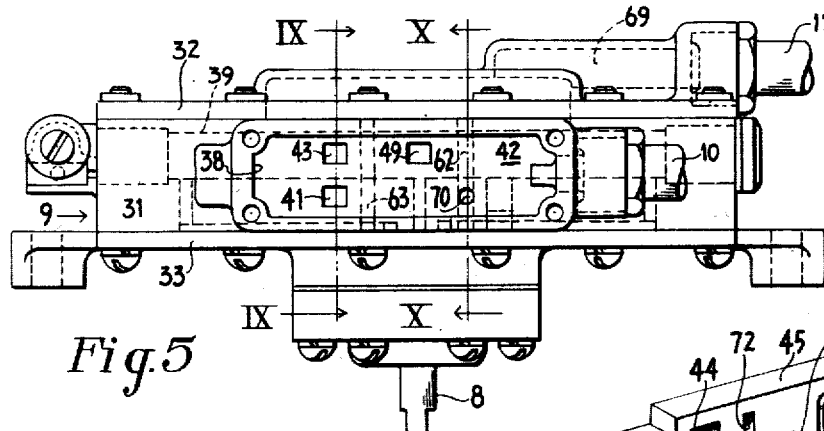
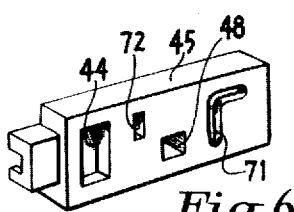
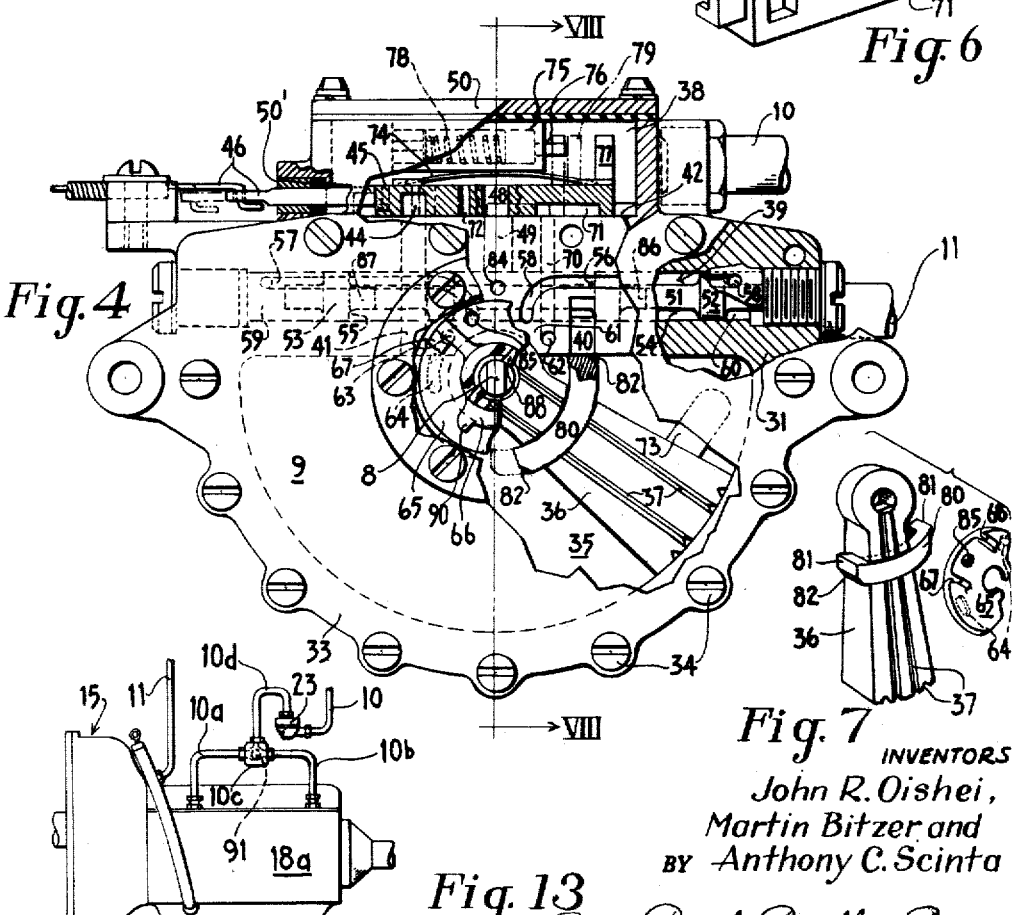

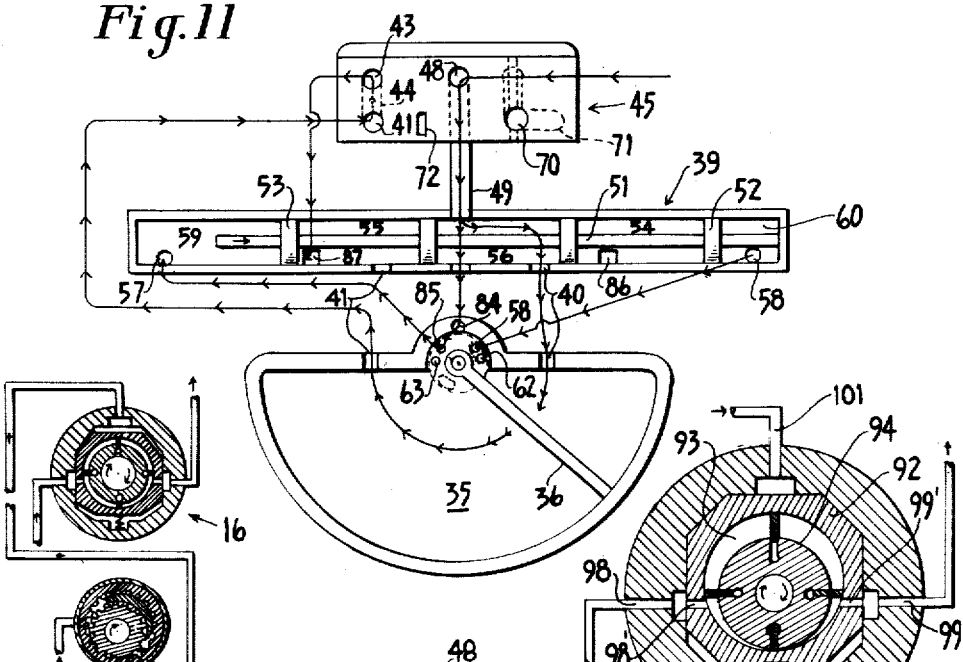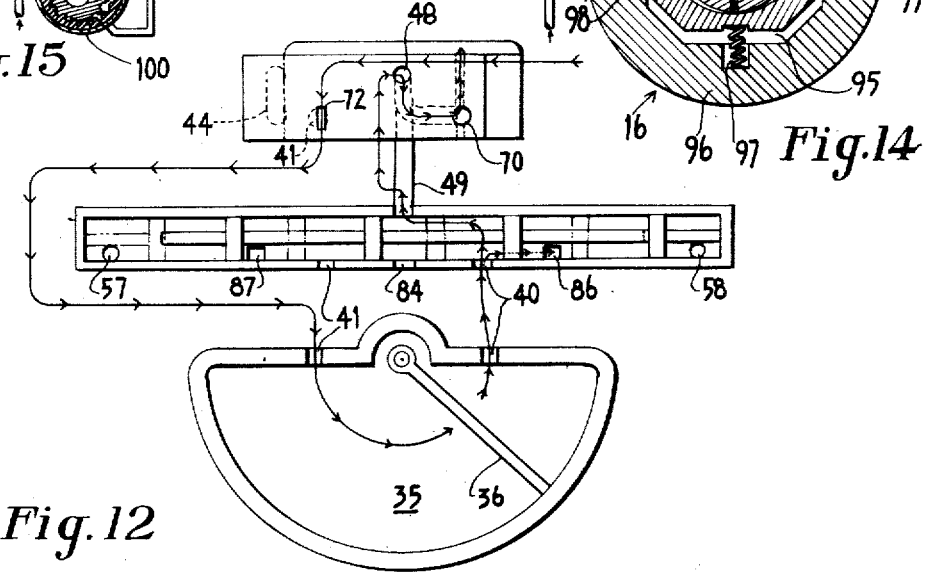

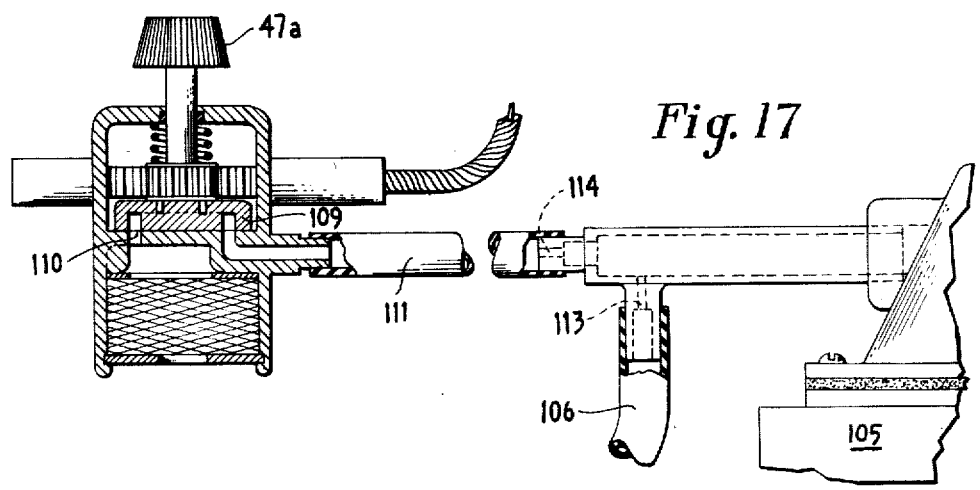
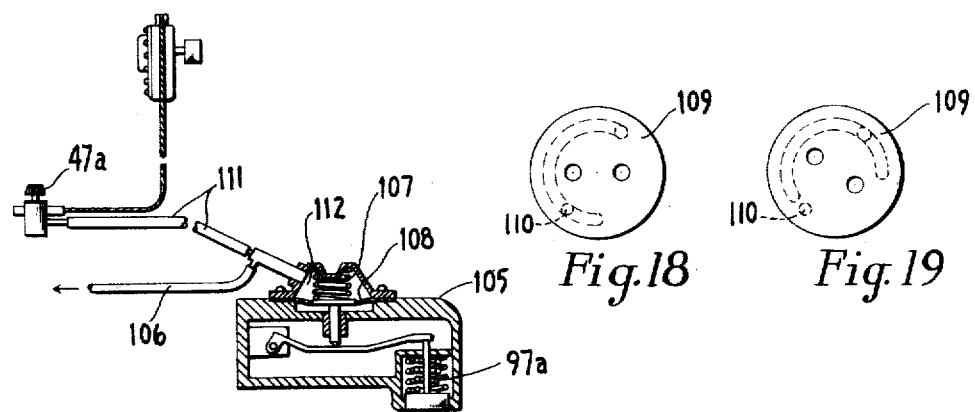
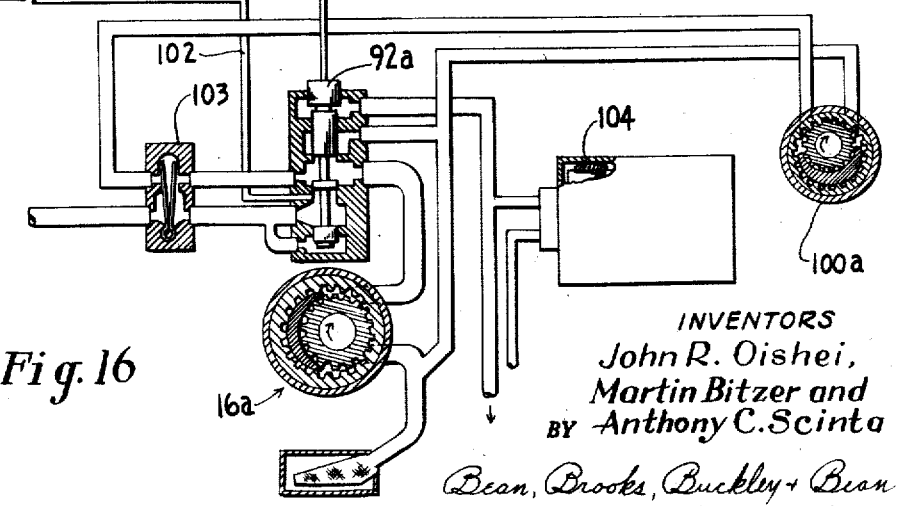

United States Patent Office 2,802,232
Patented Aug. 13, 1957

2,802,232

WINDSHIELD CLEANING SYSTEM

John R. Oishei, Buffalo, Martin Bitzer, Kenmore, and Anthony C. Scinta, Buffalo, N. Y., assignors to Trico Products Corporation, Buffalo, N. Y.

Application October 14, 1954, Serial No. 462,208

27 Claims. (Cl. 15—253)

This invention relates to power operated automotive accessories, and more particularly to a hydraulically actuated accessory system, the primary object being to provide a dependable fluid actuated accessory system in which the accessory is provided with an adequate supply of hydraulic pressure that is consistently uniform and sufficient in itself to maintain efficient and reliable accessory performance. The objective here is to be able to take off of the engine power a by-product motivating force to operate an accessory mechanism. In this instance, in particular, the end result aimed at is the operation of a windshield wiper system which will be continuous in action under all driving conditions.

For years a by-product of the internal combustion engine, namely, suction, has been used to provide the power for automativ wipers. Downdraft carburetors have lessened the available suction in the engine manifold and auxiliary pumps have been used part time in combination with manifold suction wherein the dominating one of the suction sources took over. During the intervening years it has been suggested that wipers might be powered off the lubricating oil system of the engine, but no use has been commercially made of this fluid pressure because in freezing temperatures the oil congeals and the lubricating pump lacks sufficient power to push the congealed oil through the small oil passages the sizes of which are critical for the proper functioning of the lubricating system. Higher pump pressure has not been the answer since the lubricant under high pressure would tend to flood the cylinders and the lubricant would be drawn into the firing chamber of the engine, carbonizing and defeating proper combustion.

More recently, with the introduction of the auxiliary fluid drives and automatic transmissions, a different fluid pressure source has been made available wherein the fluid is used primarily for the transmission of power. Due to the required functioning of the automatic transmission, hydraulic power is made instantly available by and upon the starting of the engine. The power must be available at all times for effecting the gear shifting operations through pressure actuated servo-units and is resident in the automatic transmission irrespective of variations in climatic conditions involving temperature changes which affect the fluidity or viscosity of the hydraulic fluid. The automatic transmission is designed to constitute a unit of dependable power transmitting hydraulic pressure with a capacity much more than sufficient to operate the gear shifting servo-units. It, therefore, presents the opportunity for advantageously coupling any accessory intended to deliver a torque load requiring hydraulic power no greater than the hydraulic power required for the servo-units. Such hydraulic power in the automatic transmission is maintained continuously at a pressure level by means of regulating mechanisms which compensate for the speed variations with much the same results as accomplished by a voltage regulator in the electric system. The hydraulic pressure is available in all automatic transmission systems to fit the particular needs of the servo-units and to change the gear automatically in relation to the power output of the engine and the speed of the vehicle. Substantially constant hydraulic pressure is maintained.

The transmission units generally include a fluid storage reservoir from which the fluid medium is withdrawn as needed by two pressure generating pumping means. This same fluid is used as a fluid coupling between the crankshaft of the engine and the input shaft to the transmission. The fluid thus employed would be available in ample quantity at all times for the withdrawal of small amounts and as needed to power a remotely located automotive accessory and without unfavorably affecting the efficiency and effectiveness of the transmission in the performance of its prime purpose, namely, the shifting of gears.

Two pressure generating pumps are used in the automatic transmission. In one form of transmission, the primary pump is of the variable displacement type and driven by the engine directly off the input shaft to the transmission. This pump is operating at all times when the engine is running and at the same speed as the input shaft. The other or secondary pump has a fixed displacement and is geared directly to the output shaft and always running at a speed that is proportional to the motion of the automobile. These two pressure generating pumps are used to offset the pumping capacity of one against the other to provide a source of fluid power that is available at all times while the vehicle is rolling for the actuation of gear shifting servo-units. This source is not depleted by the opening of the engine throttle, as is the vacuum in the intake manifold, nor is it limited, as is the hydraulic pressure of the lubricating system with its automatic bypass to protect the engine against carbonizing oil in the firing chamber. One of the two pumps used to generate the fluid pressure is directly driven by the engine and the other pump is connected to be driven by the driving wheels of the vehicle or the output shaft of its transmission unit. This tie-in between the two pumps in some transmission systems utilizes a pressure modulator or compensator in the form of a case-serving shoe which is adjusted eccentrically relative to a rotor to govern or regulate the pump displacement in inverse order to engine speed. This provides a displacement governing mechanism for the transmission.

In accordance with the present invention, and purely as a by-product, the gear shifting hydraulic power resident in the transmission is coupled into a windshield cleaner or other accessory to provide an economical and highly dependable fluid accessory system. The displacement governing mechanism serves to regulate the wiper action by affording a safe and adequate pressure for the windshield wiper. Thus the dual functions of a constant wiper operation and a wiper speed regulating control are ascribed to the gear ratio changing transmission of the vehicle in giving to the motorist a wholly practical windshield cleaner that will meet his every demand. The hydraulically controlled automatic transmission therefore constitutes an entirely dependable by-product fluid pressure source for the operation of fluid pressure accessories where the volume of fluid is reasonably limited to a moderate displacement.

The present invention resides in the combination of a hydraulically driven accessory with the automatic power transmission unit of a motor vehicle, its aim being to secure a generally uniform and dependable wiper action throughout, to provide a hydraulic windshield cleaner system having sufficient pressure to counteract any cold weather sluggish tendency in the movement of the fluid through its small passageways, and to accomplish these advantages without impairment of the transmission unit as such.

In the instance of the windshield wiper system, a novel combination is provided for the part-time need of wiper usage, as compared to the full-time usage of the hydraulic pressure in the automatic transmission, provision being made to modify the pump displacement and the pressure generation at those times when the wipers are turned on to insure a greater pump displacement in the transmission unit to preclude a pressure drop in the hydraulic line that might otherwise occur and thereby lessen the holding power of the servo-unit transmission bands which operate to transmit the engine power to the rear wheels in propelling the vehicle. Hence, the transmission mechanism which is closely engineered for its automatic functioning will not suffer from variable pressure influences resulting from the turning on and off of the accessory motor and is complementary thereto in jointly maintaining a source of effective pressure for wiper operation. When the vehicle moves faster under engine acceleration, the rear pump increases its pressure build-up and concurrently modifies the engine driven pump to decrease its supplied pressure. Both pumps pressurize a common chamber from which the wiper motor is supplied. As the rear pump increases its output the front pump will decrease its output to preclude an excessive build-up of pressure and thereby tend toward holding a practical working pressure for wiper operation. The two pumps mutually tend to supply each other's lack and are therefore in nature complementary to each other in action and function. This is made possible through the cooperation of the dual pumps of the transmission unit and the use of the rear pump to modify the pumping pressure capacity of the engine driven pump.

In another type of automatic transmission, provision is made to modify the pressure generation of the engine-driven front pump by using the pressure generated by the wheel-driven rear pump, a compensating modulator being interposed and including a by-pass valve and a diaphragm arranged to respond to the engine throttle through a connection leading into the intake manifold. Normally the action of the rear pump automatically shunts the fluid being displaced by the front pump as the rear pump takes over. When the engine throttle is partially closed, the suction in the engine manifold is applied to the modulator diaphragm to make its valve more sensitive to the hydraulic pressure to pass the fluid of the rear pump for cooperating with the front pump to hold the joint output pressure substantially constant. When the vehicle engine is under a heavy load and the throttle wide open, the manifold vacuum will fall toward atmospheric pressure and the modulator diaphragm will release its valve to be moved by spring pressure to modify the rear pump influence on the front pump, and cause both pumps to increase their pressure generating effectiveness. This temporary increase in the transmission pressure is held until the control mechanism responds to levelled off engine throttle, set at a newly attained cruising speed or for resuming the car's former sustained speed.

Full advantage is taken of an available feature found in the occasional higher hydrostatic pressure requirements of automatic transmission, which occurs just when the same extra pressure can be most effectively put to work in a wiper system, such as when overtaking and passing another vehicle, by automatically temporarily increasing the frequency of wiping strokes to wipe away faster deposits of rain and vision-clouding wheel spray.

The invention therefore also resides in the windshield cleaner system including a fluid pressure motor responsive to both manual and automatic fluid pressure controls in the wiper system and manual and automatic fluid pressure controls in an automatic transmission system. These controls are combined in a manner to obtain wiper acceleration automatically incidental to increased engine torque which produces the vehicular acceleration, as described, with the vision advantage that when the car engine throttle is opened for such frequent occurrences the transmission pressure, temporarily increased, can be thus used to transmit an accompanying kindred acceleration to the wiper motor so that spurts of speed of rotation of the car wheels are anticipated by spurts of wiper acceleration to automatically increase the frequency of moisture lifting from the glass for the accelerated speed of vehicular travel. Following such intervals of acceleration, a leveling off to a present wiping frequency comes automatically when the car assumes its sustained pace of travel. These changes take place to meet the variations in driving with automatic hydraulic pump response.

In a wiper system designed to function in combination with this latter described type of transmission, the wiper motor may be fitted with a secondary control valve which simultaneously opens and closes with the manual action of the wiper motor control valve. This secondary control, when opened, functions while the wiper is running to bleed air to the diaphragm chamber of the automatic transmission modulator. Whenever the wiper motor is taking fluid under pressure, the modulator will provide for more fluid pressure than it normally would while at the same time holding the pressure up to no less than the normal requirement of the transmission interlocking gear-changing mechanism. When the wiper motor is shut off, the bleed to the modulator diaphragm is closed.

The use of this manual wiper control to regulate the delivery of the hydraulic pump as described, is not needed in the earlier referred to shoe type of transmission system where the fluid pressure flow depends upon the eccentric adjustment of a modulator shoe within the engine-driven pump by the output of the secondary pump. When the vehicle wheels are standing still and the engine is idling or running slow, the front pump will operate under its maximum eccentricity with the modulator shoe moved to its extreme position in one direction under the urge of a primer spring. When the engine is accelerated and the fluid pressure flow increased, the modulator shoe will be shifted away from the maximum eccentric positon to displace less of the fluid.

In the wiper system embodying the modulator shoe type of transmission, the wiper conduit line is connected through a metering throttle, by means of which the limit of rise of pressure in the conduit and the wiper motor is controlled. The pressure level is set at a predetermined maximum, to eliminate the occasional rise in pressure such as occurs when the vehicle is operated in reverse where in some systems the pressure is doubled and increased even more than 100% in the transmission mechanism during such driving periods in reverse gear.

The metering throttle likewise provides a governing mechanism which can be used in either system to reduce the speed of the wiper motor when pressure in the transmission system normally drops below a predetermined level. Under such conditions the governor functions to reduce the rate of flow of fluid that otherwise would be deliverable to the wiper motor, for the purpose of substantially eliminating any effective variation in the pressures in the transmission and when the engine is cut down to very low R. P. M., as in the idling of the engine under driving conditions such as encountered at stop light intersections. Under these conditions of engine operation the governor automatically closes the line to the wiper motor to reduce the rate of flow and bring the wiper speed down accordingly to any desired normal or maximum speed of wiper operation. For example, a wiper may be reduced to half speed or as low as 70 strokes a minute, which would be maintained during the idling period when the pressure in some types of transmission drops to its lowest ebb. The transmission servo-units are thus fully protected by maintaining substantially the normal minimum transmission pressure status. Immediately upon accelerating the engine, the governor automatically cuts out to permit the former free flow of fluid to the wiper motor to pick up blade speed of travel as the vehicle is brought into motion.

A further object of the invention is to provide a motor vehicle having a hydraulic windshield cleaning system operating off from an automatic hydraulically controlled transmission to afford ample pressure for effective wiping action without impairing the efficiency of the power transmission.

Another object of the invention is to provide a fluid actuated windshield cleaning motor by which the rate of wiper oscillation may be greatly increased to meet the demand for a faster removal of the more rapid accumulation of rain on the field of vision incidental to permitted higher speed of travel on thruways, the higher rate of wiper oscillation being accomplished in a manner to protect the mechanism from injury and to secure quietness in operation.

The foregoing and other objects will manifest themselves as this description progresses, reference being had to the accompanying drawings, wherein Fig. 1 is a perspective view of an automobile in phantom and showing in full lines a windshield cleaning system embodying the present invention;

Fig. 2 is a side elevation of an automatic hydraulically controlled transmission unit of the vehicle power plant;

Fig. 3 is a detail sectional view through the pressure metering mechanism;

Fig. 4 is a side elevation of the improved windshield cleaner motor, portions being broken away for clarity;

Fig. 5 is a top plan view of the cleaner motor with the control valve and its cover plate removed;

Fig. 6 is a detail perspective view of the control valve showing the recesses thereof;

Fig. 7 is an exploded perspective view of the piston with its cushioning valve and the pilot valve control;

Fig. 8 is a transverse sectional view through the motor, taken about on line 8—8 of Fig. 4 but with the vane piston in its mid position;

Figs. 9 and 10 are detail sectional views taken about on lines 9—9 and 10—10, respectively, of Fig. 5;

Fig. 11 is a view showing diagrammatically the porting arrangement for motor operation;

Fig. 12 is a similar view for wiper parking;

Fig. 13 is a schematic showing of the common output connection of the two pumps of the automatic hydraulically controlled transmission unit;

Fig. 14 is a transverse sectional view of the compensating primary pump;

Fig. 15 is a schematic showing of the primary and secondary pumps;

Fig. 16 is a modification showing another form of automatic transmission;

Fig. 17 is an enlarged view of the manual control for bleeding air into the modulator; and Figs. 18 and 19 are detailed showings of the air valve in two positions.

Referring more particularly to the drawings, the numeral 1 designates the windshield of a motor vehicle 2 having a pair of wipers 3 mounted thereon by a pair of oscillating arms 4 which are fixed upon rockshafts, in turn, journaled at the lower side of the windshield. These shafts are equipped with pulleys 5 interconnected by a cable 6 to a driving crank 7 on the shaft 8 of the windshield cleaner motor 9. The wiper motor 9 is connected in a closed fluid circuit with the automatic transmission unit by inlet conduit 10 and outlet conduit 11. This type of automatic transmission unit, as is currently used in modern cars, is interposed between the drive or input shaft 12 of the engine 13 and the output or driven shaft 14 connected to the rear wheels 14' of the vehicle, and herein comprises a fluid coupling or torque converter 15 of the rotating casing type, having a driving rotor or turbine 15' fixed to the engine shaft 12 and a driven rotor or reaction member 15", and gear changing mechanism utilizing a pressure generating pump 16 and plural servo-units 17 that are responsive to the pump generated pressure, all enclosed within a case 18 having a liquid containing reservoir. The motor outlet conduit 11 is shown conveniently connected to the reservoir through the filler tube 19 that holds the usual level-determining dip stick 19'. The motor inlet conduit 10 is connected to the pump 16 to divert a minor portion of its hydraulic displacement to the wiper motor 9. This connection may be conveniently made through a pressure gauge opening 20 after first removing its closure plug 21, and then inserting a T coupling 22 and removably fitting the plug to one branch of the coupling for pressure gauging purposes.

Since the potential pressure of the transmission unit is far in excess to the windshield cleaner requirement, there is provided a cleaner system protector in the form of a metering or throttling mechanism 23 that is placed in the cleaner inlet conduit 10 and comprises a casing having an inflow passage 10' opening into a valve chamber 24, and its outflow passage opening into the inlet conduit. Within the chamber is a seat 25 engageable by a ball valve 26 against the urge of a spring 27. A pressure responsive diaphragm 28, on which the spring bears, carries a ball supporting pin 29. Hydraulic pressure, in excess to that determined by the spring 27, will depress the diaphragm and permit the valve 26 to approach its seat to throttle the flow of fluid through the diaphragm chamber 30 and conduit 10 to the wiper motor 9.

The automatic hydraulically controlled transmission unit contains a body of power transmitting liquid capable of retaining its fluidity at low temperatures. In laboratory tests made in sub-zero temperatures, the windshield cleaner response was concurrent with the turning over of the engine by the battery energized starter system, operating slowly at first, of course, but accelerating promptly when the engine took over under its own power. This ready response of the windshield cleaner is made possible because of the rapid build up of pressure in the pump of the transmission unit acting upon the freely flowing body of liquid therein which is constantly undergoing a conditioning process or violent agitation by the fluid coupling members 15' and 15". Thus, the fluid coupling 15 serves as a conditioner for the hydraulic windshield cleaner system so that when the body of liquid becomes pressurized by the primary pump 16 it will readily flow under the pump pressure and dislodge any flow retarding congealment from the small passages of the wiper motor during cold weather to rapidly restore and maintain its normal operation.

The metering control 23 will determine a maximum wiper system pressure quite in excess to that of the lubricating system. A range of pressures, say between fifty and eighty pounds by way of illustration, will be available and give a power reserve sufficient to effectively dislodge passage obstruction as well as to afford a high rate of wiper oscillation when needed for the faster driving on the long distance thruways. Throughout this range an effective wiper operation is obtainable without experiencing a slow unusable rate of oscillation resulting in a low frequency of wipes across the line of vision. While the hydraulic pressure at the source varies, the fluctuations all occur within a pressure range which is sufficient to give a uniformity of wiper speed that is practical. Effective windshield cleaner operation will be obtainable, as a rule, with a pressure short of the maximum pressure but the higher pressure is available to move any viscous fluid through the small passages and ports of the windshield wiper should its use be required. The result is that the wiper performance is uniform, positive and effective.

The metering control 23 will also serve as a governor to determine a minimum speed for the wiper should the pressure in the transmission unit drop as a result of turning on the windshield cleaner. This pressure drop may occur in certain automatic transmission mechanism when the engine is slowly idling at a low R. P. M. in which event it is desirous to favor the transmission unit for sustaining its servo-unit energizing pressure. Accordingly, the diaphragm 28 is provided with a flow-restricting plate 28' that is cupped and designed to seat its upstanding marginal rim 28" upwardly against the underface of the control body to reduce the liquid flow by confining its passage to a port 28a through which the flow may continue at a predetermined reduced rate. The effect is to decrease the number of wiper strokes per minute to substantially a predetermined extent. Immediately upon accelerating the engine, the metering control will unseat its rim to fully open the chamber for normal operation. The governor or metering control thus performs a dual function, namely, to guard the windshield cleaner system against an excessively high pressure, incidental to driving the vehicle in reverse, and to favor the transmission unit for maintaining its pressure requirement.

The compensating pump 16 of the transmission unit is shown in Figs. 14 and 15 as containing a pressure responsive displacement compensator in the form of a floating case-forming ring or shoe 92 having a chamber 93 to receive a fixedly journaled bladed rotor or impeller 94. The shoe is mounted in a chamber 95 within a housing 96 and is normally held by a primer spring 97 in a position of maximum eccentricity relative to the bladed rotor. The housing 96 has an inlet passage 98 communicating with the inlet port 98' of the compensator element 92, and an outlet port 99' communicating with an outflow passage 99 leading to the servo-units. The rear pump 100, located within the case 18, is driven by the rear wheels through the output shaft from the transmission unit, and a portion of the delivery from this pump is carried through conduit 101 against the shoe 92 to move it in opposition to the spring 97 thereby to reduce its eccentricity with respect to the bladed rotor. As the vehicle increases its speed, the compensator shoe will respond to the wheel driven pump pressure and move toward a concentric relationship with the rotor to accordingly decrease the primary pump displacement. Such decrease may continue until the displacement becomes nil at which time the rotor and the shoe are in full concentric relationship. When the vehicle is standing still the shoe is held by the spring in a position of maximum eccentricity or greatest displacement. Consequently, when the vehicle is driven in reverse, the wheel driven pump 100 will likewise act in reverse with the result that the engine driven pump 16 will operate at its maximum displacement to generate an excessive pressure. For this purpose the metering mechanism 23 will function to close the valve 26 and thereby protect the windshield cleaner system from injurious consequences.

The remaining portion of the output of the secondary or rear wheel driven pump unites with that of the primary pump to provide a joint source of operating pressure for the windshield cleaner. The secondary pump has a fixed displacement per revolution. However, the output of the primary pump is variable and, being under the control of the secondary pump, is designed to be decreased as the output pressure of the secondary pump increases. The two pumps are therefore complementary to each other in that reciprocally each one supplies what may be lacking in the other toward cooperatively maintaining a common source of working pressure for wiper operation.

A windshield cleaning system layout for establishing a source of operating pressure that is common to both pumps and pressurized severally and jointly thereby, is shown schematically in Fig. 13, wherein multiple pumps are used to subdivide the hydraulic pressure production between an engine driven primary pump and a secondary pump that is driven from the rear wheels of the vehicle to take over after a given speed of travel of the car is attained. In such instance, provision is made to couple the respective pumps in a manner that will allow the secondary pump to take over where the primary pump cuts out. This may be accomplished by a dual pressure connection from the transmission unit 18a, the connection comprising an engine driven pump conduit 10a and a wheel driven pump conduit 10b joined by a T coupling 10c to a common manifold pipe or chamber 10d which latter leads onto the pressure governing and metering mechanism 23. A ball check valve 91 responds to the higher one of the two pressures in the conduits 10a and 10b to close off communication with the other pump. In this manner the pumps will alternately act to provide the pressure necessary for wiper operation as they are cut in and out. In this arrangement the lead from the dual pumps is taken, as in the above described instance, through the pressure governing control 23 and on to the wiper motor through conduit 10.

Referring particularly to Figs. 16 through 19, a modified power transmission unit is shown comprising an engine driven pump 16a and a wheel driven pump 100a acting generally in the manner as the earlier described pumps through a pressure responsive compensator in the form of a system valve 92a, which latter is normally held by a primer spring 97a in a position for maximum pressure generation by the primary pump 16a, a conduit 102 carrying a portion of the primary pump displacement to the fluid coupling or torque converter while the major portion is carried through a check valve 103 to the servo-units for acting upon their drum holding bands 104 to effect the gear change operation. In this embodiment of automatic transmission, there is provided a modulator 105 that is responsive through a conduit 106 to the negative pressure influence of the intake manifold of the engine, this subatmospheric pressure acting against a diaphragm 108 to lift against the spring 107 and reduce its supplemental addition to the spring 97a. This reduction of the combined spring pressure requires a reduction of the hydrostatic pressure in order to restore the balance, as described above, and this reduction in hydrostatic pressure is accomplished by movement of the valve 92a into a position for providing a greater by-pass.

To preclude any pressure drop in the transmission system that might follow the turning on of the windshield cleaner, there is provided an arrangement by which the compensator 92a may be adjusted, in response to the opening movement of the manual turn knob 47a for the windshield cleaner 9, to regulate such compensator for securing a larger output from the primary pump 16a to compensate for that subtracted by the windshield cleaner, this being necesary to maintain the grip of the bands 104 on their drums while the windshield cleaner is being operated. Acordingly, the manual control 47a is caused to rotate the valve 109 to open a vent 110 to bleed atmospheric air through a passage 111 into the diaphragm chamber 112 of the modulator and release its spring 107 to adjust the compensator 92a accordingly. This, in conjunction with a restriction 113 in the line between the modulator and the manifold and a properly related restriction 114 in the venting passage, results in reducing the manifold vacuum as received by the modulator, and causes it to operate as though the engine throttle is opened more than it actually is. This bias over the modulator causes the dual pumping system in the transmission to maintain a pressure control in the transmission while the wiper is running substantially the same as would otherwise result when the wiper is not running.

Since the modulator 105 is responsive to the intake manifold vacuum, the act of depressing the engine accelerator for faster travel will more or less dissipate the manifold vacuum and react through the connection 106 on the diaphragm chamber 112 to impress the urge from spring 107 upon the spring 97a and move the compensator valve 92a toward its closed position to thereby further restrict the by-pass circuit connections. This will raise the hydraulic pressure of the system used for holding the servo-units operative during engine acceleration, and this increase in the transmission pressure will likewise be transmitted to the pressurized chamber 38 of the windshield cleaner control valve and through the registering ports 48, 49 and the shuttle valve 51 to accelerate the wiper driving piston 36 and increase the frequency of wiper oscillations. This increase in the wiping action will be more pronounced if the engine accelerator is quickly and more fully depressed for temporary acceleration of car speed during which heavier deposits of moisture hit the glass and increased number of wiper strokes are most needed. This increase in the wiping action will continue until the car speed levels off at the newly attained speed held by a retarded or sustained engine throttle set for constant speed of vehicular travel. Thus, for the period of temporary acceleration, the frequency increase in the wiping action will provide a means of insuring corresponding faster clearing of deposited moisture obstruction to vision from the faster travel of the vehicle to remove the greater accumulation of rain or any beclouding wheel spray. The wiper speed together with vehicle speed will increase and level off in harmony and substantially concurrently with respect to each other.

Actually the wiper motor, which instantaneously receives increased pressure, develops its higher torque before the higher engine torque is effective on the wheels, with the result that the wiper mechanism will respond quicker to give the motorist the advantage of faster wiper action ahead of the cark pick up for added safety.

The wiper motor may be of any approved construction, the one herein illustrated being of the vane piston type. Referring to Figs. 4 through 12, the wiper motor 9 has a housing composed of a body section 31 and opposing heads 32 and 33 clamped together by bolts 34 to form a motor chamber 35 for receiving the vane piston 36 in turn fixed on the motor shaft 8. In lieu of special packing, the marginal surface areas of the piston are formed with oil collecting grooves 37 for holding clearance sealing fluid. The body section 31 is provided with the control valve chamber 38 and a shuttle valve chamber 39, the latter having direct communication with the motor chamber through a combined inlet and outlet port 40 to one side of the piston. A second combined inlet and outlet port 41 leads from the opposite side of the piston and opens into the control valve chamber 38 through a valve seat 42 alongside a second port 43 from the shuttle valve chamber 39. These two ports 41 and 43 are connectable by a transverse recess 44 in the control valve 45 that is slidable upon the seat 42 by means of a push-pull flexible member 46 and a rack and pinion unit having a turn knob 47. The control valve is also provided with the pressure supply port 48 for registering with the port 49 leading from the valve seat 42 into the valve chamber 39. When the control valve is in its running position, the fluid will enter the shuttle valve chamber 39 through port 49. The valve chamber 38 is sealed liquid tight by a removable cover plate 50 and packing 50' so that it will normally hold the pressure supplied by the transmission unit pump through the inlet conduit 10.

Within the chamber 39 is arranged the pressure reversing shuttle valve 51 having lands or pressure heads 52 and 53 and intervening lands defining two port-connecting exhaust recesses 54 and 55 and a medial port-connecting recess 56, which latter is always under pressure when the port 49 registers with the pressure supply port 48. The medial recess 56 therefore establishes communication between the port 49 and the chamber ports 40 and 41, 44, 43 alternately as the valve 51 is shuttled back and forth between its two operative positions. When the chamber port 41, 44, 43 is connected to the port 49 the fluid flow will then be from the pressurized control valve chamber 38 through ports 48, 49, and said chamber port, into the motor chamber 35 to cause the piston to move in a counterclockwise direction, during which movement hydraulic fluid in front of the piston will be driven out through the companion chamber port 40, the communicating exhaust recess 54 and an exhaust port 86 that discharges into the outlet passage 69. Fig. 4 shows the motor piston 36 at the end of its counterclockwise stroke, and the shuttle valve 51 subsequently moved to its second operating position now ready to admit the hydraulic pressure from the port 49 through the chamber port 40 into the motor chamber at the right side of the piston to compel its return clockwise movement and the evacuation of the liquid in advance of the moving piston through the chamber port 41, 44, 43 into the exhaust recess 55 and out through an exhaust port 87 into the outlet passage 69.

The back and forth movement of the shuttle valve is imparted by the hydraulic pressure as alternately applied to the opposite pressure heads 52, 53 through ducts 57 and 58 that open respectively into the motor-forming compartments 59 and 60 of the chamber 39. These ducts open through a valve seat 61 on the motor head 33 alongside of exhaust ducts 63 and 62 respectively and are adapted to be alternately joined by a respective one of the two recesses 64 formed in the underside of the valve disc 65 that is pivoted on the motor shaft 8 and designed to be rocked thereby through a kicker 66 engaging one or the other of the spaced shoulders 67 and 68 on the valve disc following a limited play. The two exhaust ducts 62 and 63 for the shuttle valve extend throught the body 31 and open through its back face into outlet passage 69 for return through the outlet conduit 11 to the reservoir of the transmission unit.

For parking the wipers, the exhaust duct 62 has an upright extension 70 opening through the valve seat 42 for being connected to the port 49 by an angular recess 71 in the control valve when the latter is in its parking position, at which time the parking port 72, also formed in the control valve, registers with the port 41. This parking port will connect the pressurized chamber 38 through the chamber port 41 to the motor chamber 35 to cause the piston 36 to move counterclockwise, Fig. 4, under the pressure differential set up and until arrested by the piston carried stop pin 73 which may abut the overlying wall of the chamber. During this parking movement of the vane piston, the fluid ahead of the latter will be displaced through port 40, and out into the outlet passage, either through exhaust port 86, or through port 49, the angular recess 71, upright extension 70 and exhaust duct 62, depending upon the position of the shuttle valve 51 at the time the control valve is moved to a parked position.

The control valve is held on its seat by a spring 74 that reacts against an overhanging part 75 which houses a spring backed member 76. When the knob 47 is turned to park the wiper, the control valve is pulled from its running (full lined) position to its parking position in which the ports 71 and 72 are brought into use. During this valve movement a shoulder 77 on the valve will engage and depress the member 76 against its spring 78 so that upon the release of the knob the spring backed member will partly return the valve to a neutral position, such as is indicated at 79, in which position the pressure supply ports 48 and 72 will be blocked to preclude the pressure in chamber 38 from reaching the windshield wiper motor. Thereby the wiper motor will be protected from the system pressure whenever the wipers are not in use.

Because of the constant availability of a high liquid pressure supply for the cleaner system, a fast wiper action, running as high as two hundred strokes and more per minute is obtainable. However, the throttling unit 23 has a modulating influence, and to further protect the system and to counteract the inertia in the fast moving parts thereof, the vane piston is provided with a piston-cushioning port-throttling valve 80 which serves to restrict the ports 40 and 41, 44, 43, when they act to exhaust. Thus, the displacement of fluid from the front of the piston is retarded and thereby dampens the piston as it approaches the end of its stroke. This restriction is accomplished by the valve face 81 seating over the respective chamber port 40, 41 to substantially close the port, each face having a chamber 82 to bleed or meter the escaping fluid. This restriction provides a dashpot action to retard the piston movement at the time when the valve disc 65 reverses the hydraulic pressure on the shuttle valve to quickly shift it to its other operative position whereupon the pressure is reversed in the motor chamber.

To convert the restricted, now exhausting, chamber port 40 into a pressure supplying port and to insure a quicker return movement of the piston, the port throttling valve 80 is yieldably mounted on the piston so that the initial application of the reversed pressure will displace the valve face 81 from the port 40 to fully open the same. In the illustrated embodiment, the throttling valve is slidably mounted on the piston and projects forwardly and rearwardly therefrom, the broken line showing in Fig. 4 of this valve indicating the position to which it is initially moved hydraulically to fully open the now supplying port 40, in which position the throttling valve will be pressure-held until it seats upon the chamber port 41, 44, 43 to throttle it for checking the piston movement preliminary to starting a new stroke.

The valve 65 is enclosed within a chamber 83 which is pressurized through a duct 84 leading from the valve chamber 39 adjacent the port 49. This duct 84 opens directly into the chamber, at a point that is located outwardly beyond the periphery of the valve 65, the latter being formed with an aperture 85 to register with one or the other of the two ducts 57, 58 to establish communication between the pressurized chamber and the respective one of the motor compartments 59, 60, the unconnected compartment being connected by one of the recesses 64 to the corresponding exhaust duct 62, 63.

In the operation of the motor, and referring particularly to the diagrammatic showing of Fig. 11 wherein the parts are arranged as depicted in Fig. 4 with the control valve 45 in its running position, the pressure from the pressurized chamber 38 will flow through the registering ports 48, 49 into the medial pressure recess 56 of the shuttle valve 51 and from thence through the combined inlet and outlet port 41, 44, 43 to drive the piston counterclockwise and bring the throttling valve 80 into its active position over port 40, as shown in full lines in Fig. 4. During this counterclockwise stroke the shaft pin 88 will move the kicker 66 against the shoulder 67 to move the valve 65 to the position shown at which time the port 85 opens the motor compartment 59 of the shuttle valve to the pressurized chamber 83 to return the shuttle valve to the position of Fig. 4, which is permitted by reason of one of the recesses 64 connecting the duct 58 to the exhaust duct 62. The two operative positions of the valve 65 are determined by a fixed stop 89 with which the shoulders 90 on the valve alternately engage.

At the start of each stroke the cushioning throttle valve 80 will be initially pushed off its seat by the reverse flow of fluid into the adjacent side of the motor chamber, and as the piston moves under the pressure differential, the valve will be held in its forwardly projected position ready to engage the other chamber port which it is now approaching. The piston oscillates rapidly under the high pressure and consequently its rapid movement must accordingly be checked to suddenly retard it in counteraction of the inertia force before reversal.

For parking the wiper, the control valve 45 is shifted to the extreme left (broken line) position in Fig. 4 to connect the pressurized chamber 38 through the parking port 72 and chamber port 41 to the left side of the motor chamber 35, as schematically illustrated in Fig. 12. This connection will admit fluid pressure to drive the piston counterclockwise and evacuate the right side of the chamber by displacing the spent fluid out through the chamber port 40 and the exhaust port 86, when the shuttle valve is in the dotted line position of Fig. 12, or back up through the port 49 and the angular recess 71, down through the upright extension 70 and out through the exhaust duct 62 into the outlet passage 69, when the shuttle valve is in the full line position. This also serves to evacuate the valve action chamber 83 since the medial pressure recess 56 is blocked off from the pressurized chamber 38. Thus the wiper will always be parked in one terminal position. Upon the release of the hand knob 47, the spring 78 will move the control valve to the position indicated at 76 in which position all of the ports in the valve seat 42 will be closed. Consequently, the wiper motor will be protected from the transmission unit whenever the windshield cleaner is not in use.

The improved windshield cleaner system provides a hydraulic operation in which the power of the engine is transmitted through a fluid column maintained at a more than adequate pressure sufficient to give dependable windshield wiping action as well as to maintain a normal flow whenever the use of the windshield cleaner is demanded. The windshield cleaner system of the present invention maintains a substantially constant pressure by the cooperative functioning of the two pumps, one engine driven and the other wheel driven, to provide a modulated pressure so that the speed of the wiper is brought within the control of the compensating action. Again, it will be observed that the hydraulic pressure furnished to the windshield cleaner motor, while being more than ample for normal wiping operation, gives preference to the automatic system while providing a predetermined reduced wiper action.

Further, it will be observed that the wiper motor is provided with means for dampening its action at the moment of reversal whereby the rapid movement of the wiper during each stroke will be cushioned toward the end of each stroke but without impairing the immediate acceleration of the wiper on the succeeding stroke. The improved wiper system enables the tapping of the automatic hydraulically controlled transmission unit in a manner to secure the advantages of an all-sufficient source of pressure without impairing the normal functioning of the unit in transmitting the engine power to the driving wheels of the vehicle.

The foregoing description has been given in detail without thought of limitation since the inventive concept is capable of assuming other physical embodiments without departing from the scope of the appended claims and the spirit of the invention.

What is claimed is:

1. A hydraulic windshield cleaner system comprising a wiper, a motor driving the same, a reservoir, a vehicle-engine driven pump having an outlet leading to the motor with a return from the motor back to the reservoir and into the pump to constitute a fluid circuit, a pressure responsive compensator acting to regulate the pump output to modify its effective pressure, and a vehicle-wheel driven pump connected to the compensator to actuate it for so regulating the output pressure of the engine driven pump to decrease the output pressure of the latter as the wheel driven pump increases its speed.

2. In combination with the engine and rear wheels of a motor vehicle, a windshield cleaning system comprising a wiper, a hydraulic motor connected thereto for oscillating the same, a variable displacement pump driven by the engine and connected to the motor in a fluid circuit to supply it with an operating pressure, pressure-responsive displacement-governing means acting proportionately to car speed to decrease the pump displacement, and a second pump operable by the rear wheels of the vehicle and connected to the motor to supply it with operating pressure, said second pump increasing its output pressure with vehicle acceleration and cooperating with the first pump and helping to maintain the wiper oscillations substantially uniform throughout varying speeds of car operation.

3. A windshield cleaning system for motor vehicles, comprising a wiper, a hydraulic motor connected thereto for oscillating the same, a vehicle engine driven pump connected to the motor in a fluid circuit, pressure-responsive output governing means acting to decrease the pump output in inverse order to pump acceleration, and a second pump operable by the vehicle rear wheels and cooperating with the first pump to regulate the displacement-governing means to afford substantial uniformity in the wiper oscillations.

4. A hydraulic windshield cleaning system for vehicles having a driving wheel, an engine and a transmission, the transmission having an input connection with the engine and an output connection with the driving wheel, a windshield wiper, a motor for actuating said wiper, a first pump operated by the input connection for supplying fluid under pressure, a second pump operated by the output connection for supplying fluid under pressure, and means connecting said pumps to said motor for supplying fluid at substantially the desired constant pressure to said motor.

5. A hydraulic windshield cleaning system for vehicles having a driving wheel, an engine and a transmission, the transmission having an input connection with the engine and an output connection with the driving wheel, a windshield wiper, a motor for actuating said wiper, a first pump operated by the input connection for supplying fluid under pressure, a second pump operated by the output connection for supplying fluid under pressure, and means connecting said pumps to said motor for supplying fluid at substantially the desired constant pressure to said motor, said last-named means including a device for regulating the output pressure of the first pump.

6. A windshield cleaning system for a motor vehicle, comprising a wiper, a hydraulic motor connected thereto for oscillating the same, a pressure chamber in circuit with the motor, a vehicle engine driven pump operable to pressurize the chamber, a wheel driven second pump also operable to pressurize said chamber, and pressure regulating means responsive to the output pressure of the wheel driven pump for regulating the output pressure of the engine driven pump to modify it so that the combined pump pressure in the chamber will tend toward uniformity in frequency of wiper oscillations.

7. A windshield cleaning system for a motor vehicle, comprising a wiper, a hydraulic motor connected thereto for oscillating the same, primary and secondary pumps connected in circuit with the hydraulic wiper motor, the primary pump driven by the engine and the secondary pump independently driven by the rear wheels of the vehicle, the output of both pumps being common through check valve means, and a pressure responsive modulator arranged in the circuit and acting to control the output from said pumps to a required pressure for wiper operation.

8. In a motor vehicle having supporting wheels and an engine, a windshield wiper and a fluid driven driving motor therefor, primary and secondary pumps independently operated and connected in circuit with the motor to supply a combined operating pressure, the output of both pumps jointly and severally pressurizing the circuit through check valve means, and pressure responsive modulator means arranged in the circuit beyond the check valve means for controlling and levelling the output from both said pumps to a required pressure tending toward uniformity in wiper operation.

9. A hydraulic windshield cleaner system comprising a wiper, a fluid motor driving the same, a vehicle-engine driven pump responsive to and accelerating with engine acceleration and having an outlet leading through a passage to the motor with a return from the motor back to the pump to constitute a fluid circuit for pressurizing the passage and energizing the motor, a vehicle-wheel driven pump responsive to and accelerating with wheel acceleration and connected to the passage for pressurizing the latter and energizing the motor, and means responsive to a pressure rise in the wheel driven pump for lowering the pressure output of the engine driven pump toward keeping a substantially uniform combined working pressure in the passage for wiper operation.

10. A hydraulic windshield cleaning system comprising a wiper, a fluid actuated motor for driving the wiper, a chamber, a conduit connecting the chamber and said fluid motor, a vehicle engine driven pump having a conduit discharging into said chamber, a wheel driven pump having a conduit discharging into said chamber, means controlled by the discharge from the wheel driven pump for regulating the discharge of the vehicle engine driven pump into said chamber for maintaining the pressure in said chamber substantially uniform, and manually actuated means for operating said fluid motor.

11. The structure of claim 10, characterized in that the means in said chamber for regulating the discharge of the vehicle engine driven pump is a valve member controlling the flow from both of said pumps.

12. In a windshield wiper system for use on a motor vehicle powered by an engine and having its traction wheels driven through a transmission, a windshield wiper and a fluid motor for actuating same, the improvement comprising an engine driven pump for supplying fluid under pressure to said windshield wiper motor, a second pump supplying fluid under pressure to said windshield wiper motor, said second pump being driven by the traction wheels of the vehicle, and control means operated by fluid pressure from the second pump, said control means normally operating to maintain the pressure from the engine driven pump below a predetermined maximum and shunting fluid pressure from the second pump to the windshield wiper motor when the pressure from the first pump is below the maximum required for the normal operation of the windshield wiper motor, whereby the motor of the windshield wiper is supplied with required pressure for normal uniform operation.

13. The structure of claim 12, characterized in that manual means are provided for regulating the operation of the windshield wiper motor.

14. A hydraulic windshield cleaning system comprising a wiper, a fluid actuated motor for driving the wiper, a vehicle engine driven pump for supplying fluid under pressure to said motor, a wheel driven pump for supplying fluid under pressure to said motor, and means in said system controlled by the pressure from the wheel driven pump for regulating the pressure of the vehicle engine driven pump for maintaining the fluid pressure to said motor substantially determined.

15. A hydraulic windshield cleaning system for vehicles having a driving wheel, an engine and a transmission, the transmission having an input connection with the engine and an output connection with the driving wheel, a windshield wiper, a motor for actuating said wiper, a first pump operated by the input connection for supplying fluid under pressure, a second pump operated by the output connection for supplying fluid under pressure, means connecting said pumps to said motor for supplying fluid under pressure to said motor, and means in said system for maintaining constant fluid pressure to said motor.

16. A hydraulic windshield cleaning system according to claim 4, wherein said connecting means includes a wiper control interposed between the motor and the pumps for automatically regulating the action of the wiper to hold it substantially to a desired constant.

17. A windshield cleaning system for motor vehicles, comprising a wiper, a hydraulic motor connected thereto for oscillating the same, a vehicle engine driven pump connected to the motor in a fluid circuit, pressure-responsive output governing means acting to modify the pump output, and a second pump operable by the vehicle rear wheels and cooperating with the first pump to regulate the output governing means to afford substantial uniformity in the wiper oscillations.

18. A hydraulic windshield cleaner according to claim 4, wherein said engine has engine controlling throttle means and said connecting means is responsive to a pressure rise in manifold pressure in said engine controlling throttle means due to wide open engine throttle to bias the pressure regulation for accelerating the wiper automatically during pick-up in vehicular speed.

19. A windshield cleaning system for a motor vehicle, comprising a wiper, a fluid motor for actuating the same, said motor vehicle including a power source, traction means, a hydraulic transmission, an input shaft between the power source and said transmission and an output shaft connecting the transmission with the traction means, a first fluid pressure system including a pump actuated by said input shaft and a fluid circuit, a second fluid pressure system including a pump actuated by said output shaft and a circuit therefor, both of said circuits delivering fluid pressure to said motor for operating the same, and pressure operated control means for the two systems acting to maintain a continuous effective pressure for the wiper motor.

20. In combination with a vehicle propelling hydraulically controlled transmission assembly having an input shaft and an output shaft with a pressure generating pump driven from the input shaft and operable to pressurize speed change gearing, a windshield cleaner having a wiper and a hydraulic motor, the latter connected in fluid circuit with the pump as a source of operating pressure, control means regulatable to operate the motor, and pressure controlling means responsive to the speed of the output shaft and arranged in the fluid circuit for regulating the output pressure of the engine driven pump to control the hydrostatic pressure from the pump to the motor, tending to hold the wiper operation to a predetermined speed.

21. A motor vehicle having a hydraulically controlled pressure generating transmission unit with gear ratio changing servo-units responsive to an engine driven pressure generating pump, wiping means movable back and forth, a hydraulic windshield cleaner motor connected to the pump as a source of operating pressure and responsive to its pressure for operating the wiping means, to and fro circuit flow connections between the pump and the motor, manual control means for opening and closing the flow connections to operate the windshield cleaner motor, a wheel driven pressure generating pump connected to the motor as an alternate source of operating pressure and effective on the first pump to modify its operation, thereby producing output pressures thereof that vary inversely with the speed of the vehicle and tending to maintain a constant speed of the cleaner motor.

22. In combination with the engine and rear wheels of a motor vehicle, a windshield cleaning system comprising a wiper, a hydraulic motor connected thereto for oscillating the same, a variable displacement pump driven by the engine and connected to the motor in a fluid circuit, pressure-responsive displacement-governing means acting to modify the pump displacement, and a second pump connected to the motor in fluid circuit and operable by the drive for the rear wheels in direct ratio of speed to the said rear wheels, the second pump being effective on the displacement-governing means of the variable displacement pump and producing output pressures thereof that vary inversely to the speed of the wheels, thereby tending to maintain the wiper oscillations substantially uniform throughout varying speeds of vehicle operation.

23. In a motor vehicle, a windshield cleaner comprising a wiper having a fluid actuated motor, an engine driven pump in fluid circuit with the wiper motor for operating the wiper, a wheel driven pump in fluid circuit with said wiper motor for operating the wiper, said pumps being operable jointly and severally and each pump being operable when the other pump is ineffective for providing wiper operation.

24. In a motor vehicle, a windshield cleaner comprising a wiper having a fluid motor, an engine driven variable displacement pump in fluid circuit with the wiper motor for operating the wiper by the developed output pressure, a wheel driven fixed displacement pump operable to modify the pressure output of the engine driven pump toward a substantially uniform combined pump pressure in the fluid circuit for wiper operation, and means for controlling the operation of the motor.

25. A motor vehicle driven by an internal combustion engine and including a fluid pressure controlled propelling mechanism, a windshield wiper system including a fluid pressure motor having a piston driving an oscillating shaft, an arm and blade assembly connected to said shaft, circuit flow conduit means connecting said motor to said fluid pressure controlled propelling mechanism, control means for said motor to regulate its speed of operating the blade assembly, pressure throttling means in the conduit means to limit the transmission of pressure from said mechanism to said motor to oscillate said arm and blade assembly, and secondary means to retard the piston movement under the throttled pressure delivered by said pressure throttling means.

26. A motor vehicle having an engine driven fluid pressure controlled transmission for driving the rear wheels of the vehicle, a windshield wiper and motor therefor, and fluid circuit means between the motor and said transmission, said fluid pressure controlled transmission including a fluid pump driven substantially at engine speed and another fluid pump driven at speeds proportional to the speed of the motor vehicle, and means interconnecting the two pumps and correlating their action so that they will jointly and severally maintain a working pressure in the fluid flow circuit for actuation of said windshield wiper.

27. A hydraulic windshield cleaning system according to claim 4, wherein means are interposed between the wiper motor and the transmission pumps for effecting a reduction in the wiper speed to give preference to the transmission to favor the latter for maintaining its pressure requirement.

References Cited in the file of this patent

UNITED STATES PATENTS

| 1,731,048 | Holmes et al. | Oct. 8, 1929 |
| 1,744,069 | Dapron | Jan. 21, 1930 |
| 2,272,243 | Jacobsson et al. | Feb. 10, 1942 |
| 2,296,876 | Samiran et al. | Sept. 29, 1942 |
| 2,298,474 | Ericson et al. | Oct. 13, 1942 |
| 2,332,593 | Nutt et al. | Oct. 26, 1943 |
| 2,420,155 | Tucker | May 6, 1947 |
| 2,516,203 | Greenlee et al. | July 25, 1950 |
| 2,543,686 | Brown | Feb. 27, 1951 |
| 2,562,464 | Jandesek | July 31, 1951 |
| 2,612,141 | Freedman et al. | Sept. 30, 1952 |
| 2,616,400 | Sprague et al. | Nov. 4, 1952 |
| 2,627,251 | Sprague et al. | Feb. 3, 1953 |
| 2,638,746 | Kelley | May 19, 1953 |
| 2,682,787 | Holdeman | July 6, 1954 |

FOREIGN PATENTS

| 594,150 | Great Britain | Nov 4, 1947 |

UNITED STATES PATENT OFFICE

CERTIFICATE OF CORRECTION

August 13, 1957

Patent No. 2,802,232

John R. Oishei et al.

It is hereby certified that error appears in the printed specification of the above numbered patent requiring correction and that the said Letters Patent should read as corrected below.

Column 1, line 30, for "automativ" read -- automatic --; column 3, line 17, beginning with "and", second occurrence, strike out all to and including "function" in line 30, and insert the same after "pump" and before the period in line 33, same column; column 4, line 10, for "present" read -- preset --; column 5, line 1, after "up" insert -- wiper --; line 5, strike out "from"; column 9, line 28, for "cark" read -- car --; column 13, lines 7 and 8, for "displacement" read -- output --.

Signed and sealed this 29th day of October 1957.

(SEAL)
Attest:
KARL H. AXLINE
Attesting Officer

ROBERT C. WATSON
Commissioner of Patents